(12) United States Patent
Yeoh et al.

(10) Patent No.: US 7,805,021 B2
(45) Date of Patent: Sep. 28, 2010

(54) ELECTRONIC IMAGE REGISTRATION BASED ON CHROMINANCE CHANNEL

(75) Inventors: William Yeoh, Rochester, NY (US); Ramesh Nagarajan, Pittsford, NY (US); James M. Maryniak, Batavia, NY (US)

(73) Assignee: Xerox Corporation, Noprwalk, CT (US)

( * ) Notice: Subject to any disclaimer, the term of this patent is extended or adjusted under 35 U.S.C. 154(b) by 1595 days.

(21) Appl. No.: 10/615,088

(22) Filed: Jul. 8, 2003

(65) Prior Publication Data
US 2004/0114147 A1 Jun. 17, 2004

Related U.S. Application Data

(60) Provisional application No. 60/434,212, filed on Dec. 17, 2002.

(51) Int. Cl.
*G06K 9/32* (2006.01)
*G06K 9/00* (2006.01)
(52) U.S. Cl. .................... 382/294; 382/162
(58) Field of Classification Search .............. 382/294
See application file for complete search history.

(56) References Cited

U.S. PATENT DOCUMENTS

| | | | |
|---|---|---|---|
| 5,384,621 A | 1/1995 | Hatch et al. ............. 355/204 |
| 5,488,464 A | 1/1996 | Wenthe, Jr. et al. ......... 355/233 |
| 5,528,387 A | 6/1996 | Kelly et al. ................. 358/488 |
| 5,748,344 A | 5/1998 | Rees .......................... 358/505 |
| 5,959,290 A | 9/1999 | Schweid et al. .......... 250/208.1 |
| 6,078,051 A | 6/2000 | Banton et al. ............ 250/341.1 |
| 6,122,393 A | 9/2000 | Schweid et al. ............. 382/112 |
| 6,137,904 A * | 10/2000 | Lubin et al. ................. 382/162 |
| 6,166,394 A | 12/2000 | Rubscha ................. 250/559.42 |
| 6,345,116 B1 * | 2/2002 | Kojima et al. ............... 382/167 |
| 6,356,672 B1 * | 3/2002 | Feng et al. .................. 382/312 |
| 2002/0126299 A1 * | 9/2002 | Buchar et al. ................ 358/1.9 |

\* cited by examiner

*Primary Examiner*—Bhavesh M Mehta
*Assistant Examiner*—David P Rashid
(74) *Attorney, Agent, or Firm*—Pillsbury Winthrop Shaw Pittman LLP (57) ABSTRACT

A method to detect edges based on chrominance information alone or in combination with gray level values includes comparing chrominance values to a registration parameter based on chromacity measurements of a backing. To calibrate a system, a small scan obtains sample image data for the backing in the document feeder. Using the sampled image data, average chrominance values for the backing are determined. Based on the averages, a channel having a low chrominance contribution is selected as the registration channel. A registration parameter is calculated for automatic registration of documents based on the average chrominance and chrominance deviation for the registration channel.

11 Claims, 4 Drawing Sheets

ELECTRONIC IMAGE REGISTRATION BASED ON CHROMINANCE CHANNEL

This is based on Provisional Patent Application No. 60/434,212, filed Dec. 17, 2002.

FIELD OF THE INVENTION

The present disclosure relates generally to electronic image registration in digital scanners, and more particularly, the teachings herein relate to a method for edge detection using chrominance information.

BACKGROUND AND SUMMARY

In the reproduction of copies of an original document from video image data created, for example, by electronic input scanning from an original document, it is often desirable to provide functions dependent upon determining the exterior edges of the document. Such features include, for example, automatic magnification, automatic two-up copying, deletion of background image data which falls outside the detected exterior edges of the document to avoid storing a document requiring more space than necessary, automatic location of the document in a scanning system, electronic registration and deskewing of the electronic image, etc. In other words, to provide these features, the exterior edges of the document must somehow be detected by the scanning system.

In addition to the features identified above, the identification of the exterior edges of the document is necessary when scanning a document fed with a constant velocity transport (CVT) device, especially in a center-registered document feeding system. Typically, an edge detection operation is used to determine the arrival, as well as the side edges of individual input documents so as to set the start/stop coordinates and thereby identify the image area for capture and processing. That is, the scanner uses the edge detection operation to determine the presence, exact location, and size of a document being imaged in a CVT device. Such registration operation becomes extremely important issue in the case of dual head scanners to ensure that the front and backside of a scanned page is perfectly aligned.

As should be appreciated, to provide an edge detection operation the exterior edges of the document must somehow be detected by the scanning system. Conventionally, to achieve the detection of the exterior edges of the original document, digital scanners use a backing (e.g., a platen cover or, in a CVT, a baffle or ski) that is readily distinguishable from the original document. That is, edge detection typically relies on the ability of the digital scanner and/or the image processing system to sense a difference, such as the difference in reflectance between the input document's background and the surrounding backing, e.g., the platen cover, backing plate, baffle, ski, etc. Traditionally, the difference between the grayscale values of the scanner backing and the document was used for edge detection. To enable such detection, the document is preferably passed between the scanner and a black (or other dark color) backing. However, backings with a yellow color, a whiter than white color, a backing which fluoresces, and various other alternatives have also been employed.

Although various alternatives have been utilized, it is desirable to utilize a dark backing when scanning an original document so as to eliminate show through when scanning a double-sided or watermarked document (especially for thin or partially translucent originals). Utilizing a light absorbing backing (e.g., black or dark color) eliminates show through when scanning the document and enables the scanning system or other downstream image processing system to automatically locate the exterior edges of the original document. However, an undesirable consequence of using a light absorbing backing is that any defect in the original document; such as holes, cuts, rips, dog-ears, etc. or other characteristic properties of the original; such as pre-punched holes, etc.; appear as dark objects (also referred to as a scanning artifact) when they are displayed electronically or rendered and printed on a recording medium, whether they are printed immediately, faxed or subsequently or remotely printed.

Various image processing systems are available for recognizing, and eliminating by image processing, scanning artifacts corresponding to defects in the originals. One such solution proposes the use of two sets of color sensitive sensors (photosites), each set being sensitive to a different color of light and a backing having a predetermined color. The predetermined color of the backing is selected such that it appears nearly black to one set of sensors and appears nearly white to a different set of sensors. For example, the system might include a backing that is a saturated yellow with a set of sensors that is sensitive to blue being used for edge detection and a set of sensors that is sensitive to green being used for image capture. Such a solution can be used with color scanners wherein a single channel, such as blue may used for edge detection and registration with all three sensors (red, green, blue) being used for image capture.

While systems and methods based on the solutions above provide good detection and artifact removal, they are not appropriate for every application. For example, when scanning in a color space such as YCbCr or Lab, dynamic registration based on grayscale contribution may not be feasible. Additionally, in some applications the document and the color of the ski may be such that there may not be sufficient luminance variation between the document and the color of the ski in any channel to enable accurate document registration.

In accordance with the teachings herein, there is disclosed a method for dynamic registration using chrominance information. Briefly, an embodiment of a detection algorithm will look for an appreciable difference in chrominance levels to perform edge detection. To calibrate, a small scan is performed to determine the color of the backing/ski in the document feeder. Based on the detected color and video statistics (e.g., chrominance mean and deviation) of the backing/ski, appropriate channel and suitable set of registration parameters are calculated for automatic registration of documents. The calculated registration parameters are then used to automatically register documents supported by the backing/ski.

In accordance with another aspect of the teachings herein, there is provided a method of automatically detecting registration parameters for a selected backing surface. The method includes obtaining image data comprising a representative sample of the backing surface, the image data including chrominance values for selected pixel locations along a scanline; determining an average chrominance value for at least one channel; determining a chrominance deviation; and determining registration parameters based on the average chrominance value and the chrominance deviation.

In accordance with another aspect of the teachings herein, there is disclosed a method of edge detection using multiple channels. The method includes receiving scanned image data for a plurality of channels; performing an edge detection operation using image data from a first channel to identify a first detected edge; performing an edge detection operation using image data from a second channel to identify a second detected edge; and performing a resolution operation to identify an actual document edge from the first detected edge and the second detected edge.

BRIEF DESCRIPTION OF THE DRAWINGS

The embodiments and teachings disclosed herein will be described in detail, with reference to the figures, wherein.

DETAILED DESCRIPTION

For a general understanding of the present disclosure, reference is made to the drawings. In the drawings, like reference numerals have been used throughout to designate identical elements.

In the following description, the terms fastscan direction and slowscan direction are utilized. As used in the description, fastscan direction refers to the scanning of pixels along a scanline or raster. This is also commonly referred to as the electronic scan in that the scanning is a result of collecting image data from an array of photoelectric sensors. Slowscan direction, on the other hand, refers to the direction of the relative movement between the document and the scanning system. This is the mechanical movement that causes the scanning system to generate scanlines of image data.

One common method of edge detection (electronic registration) in digital scanners is performed by looking for a "black-to-white" and "white-to-black" transitions. For purposes of discussion, the ski is identified as being black and the document is identified as white as many scanners use a backing having a low luminance that appears very dark or "black" to at least one channel of a scanner while the input document has a luminance that is typically much higher (whiter) than the color of the ski. However, it is understood that (and the teachings herein are equally applicable to) a system wherein the ski considered white and the document is considered black. That is, the ski has a luminance that is typically much higher (whiter) in one or more channels than luminance of the average input document.

As an input document travels in the scanning paper path, the electronic registration module monitors the in image data to identify black to white and white to black transitions. By tracking the transitions in the fastscan and/or slowscan directions, the location of edges and corners of a document can be determined. In edge detection operation based on the identification of "black-to-white" and "white-to-black" transitions, the accuracy of the document edge detection depends on three registration parameters: Black Average Register (BAR), White Average Register (WAR), and Step Change Register (SCR). The BAR identifies a black level threshold wherein input video having a gray level or luminance less than (i.e., darker or blacker than) the value in this register as treated as being outside the document. The WAR identifies a white level threshold wherein input video having a gray level greater (i.e., lighter or whiter) than the value in this register as treated as being inside the document. The SCR identifies a value wherein input video having a change over N pixels (measured as the absolute difference between average of N/2 darkest pixels and the N/2 lightest pixels) greater than the SCR value is treated as an edge. These three registration parameters as typically pre-determined. A detailed description of an exemplary electronic registration algorithm could be found in U.S. Pat. No. 5,528,387, incorporated herein by reference.

As noted above, when scanning documents utilizing a digital scanning system, it is desirable to utilize a light absorbing (e.g., black or dark) backing so as to eliminate show through and to enable automatic location and orientation of the original being scanned, thereby enabling auto-registration and electronic deskewing processes to be performed. Furthermore, as noted above, a problem with utilizing a dark backing for copying occurs when documents have defects such as holes, rips, or dog ears. For example, if a document contains punched holes, the areas corresponding to the punched holes will become black on the copy if a black backing is utilized. This is due to the fact that the captured image has the backing area's gray value (black) wherever the hole is present in the original document. Various systems and methods have been proposed to eliminate these artifacts. These solutions have met with varying degrees of success for selected situations.

To resolve this problem, a reproduction system wherein the backing skis in a CVT system are readily detachable to allow a user to select an appropriate ski for use with a given application can be used. One such exemplary system is disclosed in U.S. patent application Ser. No. 2002/0126299-A1, entitled "Document Scanner Having Replaceable Backing and Automatic Selection of Registration Parameters", incorporated herein by reference. Briefly reviewing, the ski in a CVT system of a digital scanner beneficially covers the entire imaging area of the input scanner. An input document covers a portion of the ski (in the fastscan direction) as it travels the scanning path (slowscan) past the input scanner. Conventionally, edge detection operations look for transitions between the backing ski and the document. To enable accurate edge detection, the teachings herein disclose a method for automatically loading a suitable set of parameters for edge detection processing for the given ski.

Figure 1:
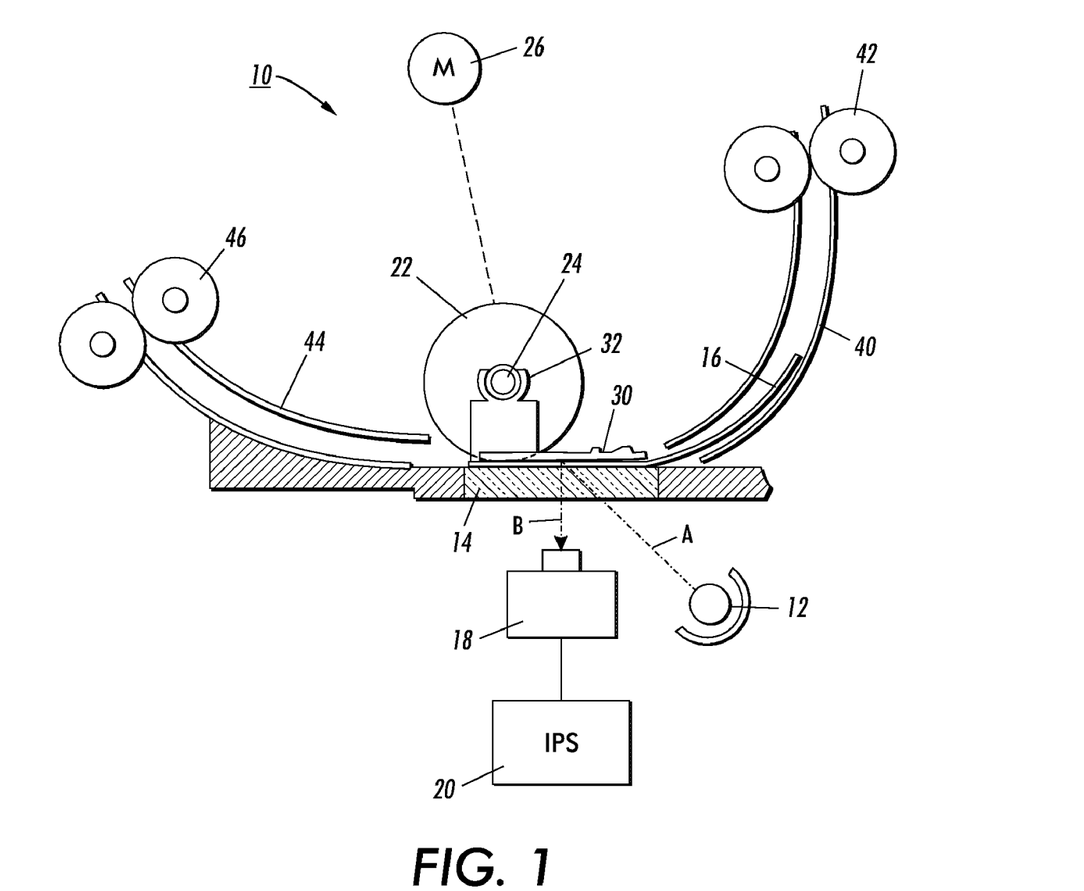
FIG. 1 is a schematic view of a portion of a CVT document handling and digital imaging system incorporating features of the present invention.

Turning now to FIG. 1, there is illustrated a portion of a constant velocity transport (CVT) document handler and imaging system 10 operable in accordance with the teachings disclosed herein. Merely by way of one example, a complete description of CVT document feeding system with which an embodiment of the subject invention may be utilized is described and shown in U.S. Pat. No. 5,488,464, issued Jan. 30, 1996 to Steven J. Wenthe, Jr., et al. and incorporated herein by reference.

Illumination source 12 generates light A which passes through platen glass 14 and is reflected off document 16 as reflected light B which is then received by sensor 18. Beneficially, sensor 18 comprises a raster input scanner (RIS) having a length, transverse to the page, sufficient to scan the entire width of the largest document supported by the handler. RIS 18 receives the reflected light B and converts the reflected light into video data identifying the particular gray level value (e.g., a value from 0 to 255 for an eight bit system), for each pixel across the scanline. The video data is supplied to image processing system (IPS) 20 which operates on the image data to identify registration parameters in a manner described below. For purposes of the present discussion it will be assumed that a gray level of 0 represents black and a gray level of 255 represents white. However, it should be appreciated that the teachings herein are applicable to other representations including, for example using more or less than 8 bits as well as using a system wherein a greater gray level value represents a darker (or "blacker") pixel and a lesser gray level value represents a lighter (or "whiter") pixel.

Document 16 is passed over sensor 18 (platen glass 14) by roller 22 on roller shaft 24 driven by motor 26. The CVT system includes a baffle 30 (also commonly referred to as a CVT ski), positioned to support document 16 against or in close proximity to the platen glass and provide a suitable image backing. As should be appreciated, to provide a suitable backing, the skis should cover the entire sensor (RIS) 18. That is, the length of the ski in the fastscan direction should be at least equal to the length of the RIS. In accordance with aspects of the teachings herein, baffle 30 may include one or more shaft clips 32 which enable the ski to be readily attached to or detached from roller shaft 24. The CVT system further includes chute 40 and rollers 42 to guide the original document to roller 22. Chute 44 directs the document away from roller 22 to rollers 46 which operate to carry the original document from roller 22.

Figure 2:
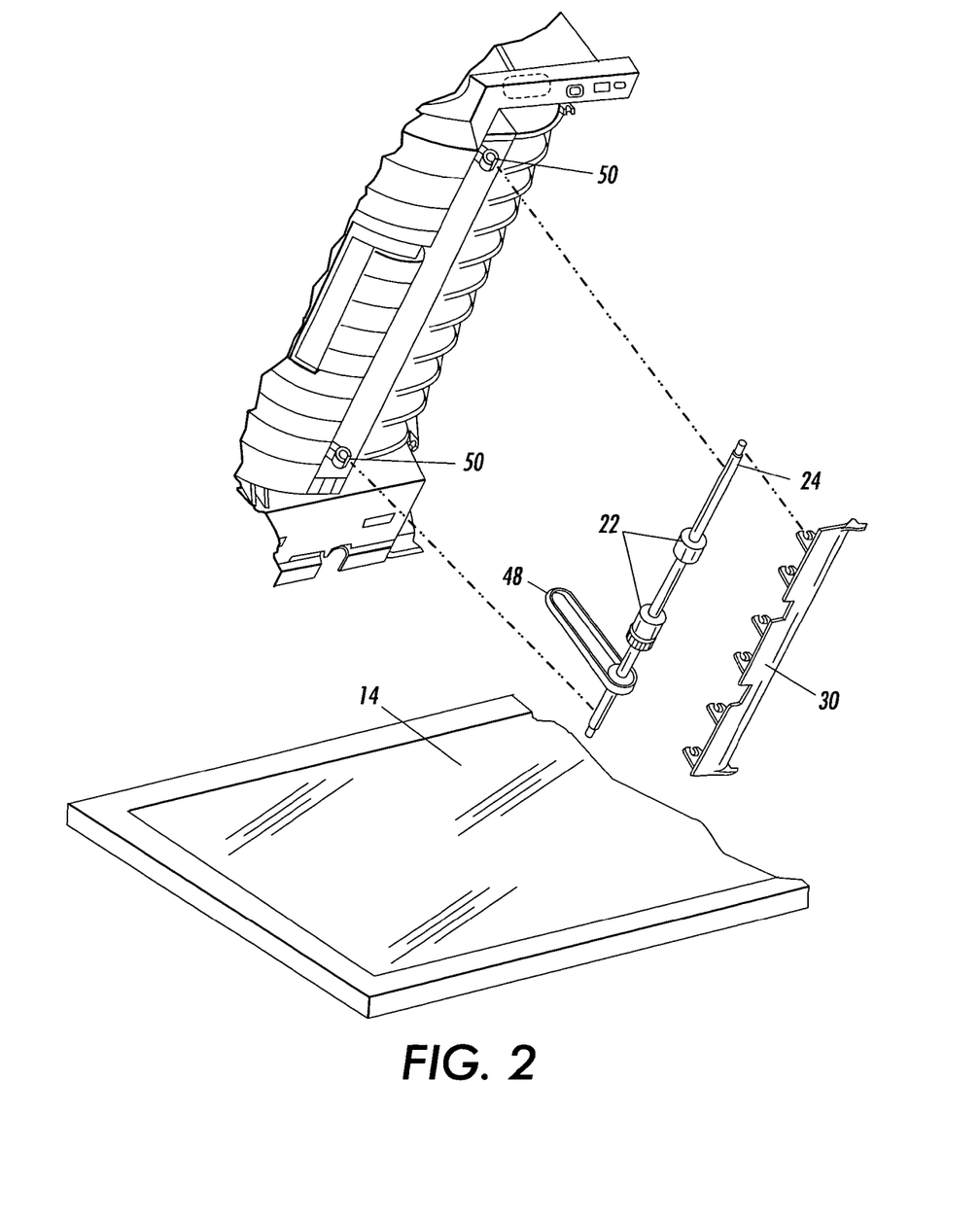
FIG. 2 is a perspective view of a CVT document handling system including a detachable ski in accordance with aspects of the present invention.

FIG. 2 illustrates one example of a detachable, snap-on engagement of CVT ski 30 with roller shaft 24. The embodiment of FIG. 2 includes two rollers 22 on a common roller shaft 24. Beneficially, the two rollers 22 are spaced axially along roller shaft 24 so as to both be within the width of the narrowest document sheet to be fed, yet spaced far enough apart to ensure two distinctly spaced contact areas with every document. Roller shaft 24 is shown as being driven by belt 48; however, it is understood that belt 48 may be replaced by various alternatives including, for example, a toothed belt, a chain, one or more gears, etc. Roller shaft 24 is shown as being coupled to the CVT document handler using clips 50.

As described above, aspects of the present disclosure provide a CVT document handler and imaging system wherein the backing skis are readily detachable to allow a user to select and change to an appropriate ski for use with a given application without requiring the user to change software or reprogram scanning parameter values. That is, the system automatically loads a suitable set of registration parameters for edge detection processing for the given ski.

Figure 3:
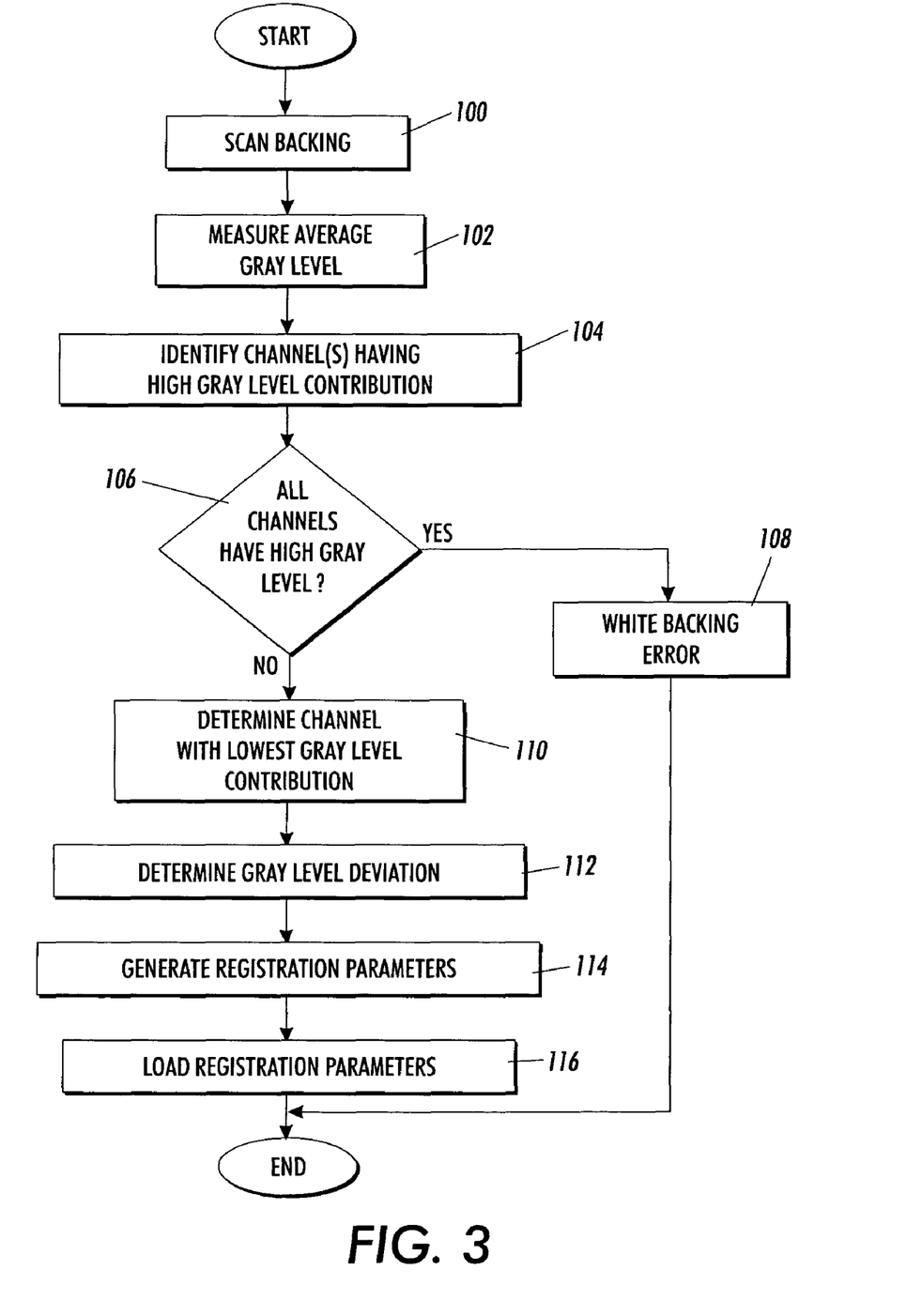
FIG. 3 illustrates an embodiment of a process for using registration parameters for electronic registration of documents supported by an associated ski.

Turning now to FIG. 3, there is shown a flowchart illustrating the steps in an embodiment of a process to accomplish the automatic loading of a suitable set of parameters for edge detection processing for the given ski. The process begins at step 100 by scanning the CVT ski with sensor 18. The scan provides the gray level value P of each pixel in the scanline for each channel (e.g., Red, Green, Blue) for the ski installed in the scanner. That is, if the scanline contains N pixels, step 100 provides three sets of gray level values $Rp_i$, $Gp_i$, $Bp_i$ for i=1 to N. In step 102, the average gray level contribution for each of the RGB channels is computed. The average gray level for each channel provides an indication of the color of the ski. Beneficially, the average gray level contribution of each RGB channel ($\mu_R$, $\mu_G$, $\mu_B$) is generated using the gray level value from each pixel across the scanline. That is:

$$\mu_R = \sum_1^N (Rp_i/N) \tag{1}$$

$$\mu_G = \sum_1^N (Gp_i/N)$$

$$\mu_B = \sum_1^N (Bp_i/N)$$

It should be appreciated that the average gray level values $\mu_R$, $\mu_G$ and $\mu_B$ can also be computed using a sampling or subset of pixels across the scanline. It should also be appreciated that although described as computing the average gray level for each channel received, the process can limit the computation of average gray level to a subset of the channels.

Using the computed average gray level values $\mu_R$, $\mu_G$ and $\mu_B$, the process, at step 104 identifies the channel or channels having a high average gray level contribution (high luminance values). At step 106, the process determines if all three channels have luminance values above a threshold. That is, step 106 determines if the ski looks "white" to each channel. If so, the process provides an error message indicating that the installed ski is not suitable for registering documents (step 108). Alternatively, if the scanning system is designed to performing edge detection operation using a white or whiter than white backing, step 108 enables the system to perform such an operation by, for example, loading the appropriate parameters and processing routines into the image processing system.

On the other hand, if one or more channels do not have high luminance values, the process continues with step 110 wherein the channel with the lowest average gray level is identified. As noted above, it is desirable to have the backing area either a dark color or black. By having the backing area dark, any pixel having a low reflectance value (low gray level contribution) can be considered a potential backing pixel. With edges being identified as a large, sharp variation of the gray levels across the pixels. Thus, the channel with the least gray level contribution will be used for document edge detection.

Once the channel (or channels) to be used for registration are identified, the process determines the gray level deviation of the ski in that channel (or channels) in step 112. The gray level deviation is the difference between the maximum and minimum gray level received in a given for the scan. The gray level deviation provides a measure of the variability across the ski which aids in calculating the registration parameters necessary for document detection.

For example, assuming an application wherein the backing ski has a yellow or green-yellow color. With such a backing, the blue channel would yield the lowest gray level values and, thus be used for registration. However, it should be understood that the ski can be any color including, for example, reddish, greenish, yellowish, greenish-yellow, bluish, bluish-purple, cyanish, magentaish, etc. Assuming the blue channel is used for registration, step 112 generates the gray level deviation $\Delta_B$ as difference between the maximum gray level and minimum gray level in the blue channel $$\Delta_B = \text{maximum gray level} - \text{minimum gray level} \tag{2}$$

Having generated the gray level deviation for the detection channel at step 112, step 114 generates the three registration parameters: BAR, WAR and SCR according to the following equations:

$$BAR = \begin{cases} \mu_B & \text{if } \mu_B \geq \delta_1 \\ \delta_1 & \text{if } \mu_B < \delta_1 \end{cases} \tag{3}$$

$$SCR = \begin{cases} \Delta_B & \text{if } \Delta_B \geq \delta_2 \\ \delta_2 & \text{if } \Delta_B < \delta_2 \end{cases} \tag{4}$$

$$WAR = \begin{cases} \mu_B + \Delta_B & \text{if } \mu_B + \Delta_B \geq \delta_3 \\ \delta_3 & \text{if } \mu_B + \Delta_B < \delta_3 \end{cases} \tag{5}$$

wherein $\delta_1$ is the minimum black threshold level, $\delta_2$ is the minimum step change level and $\delta_3$ is the minimum white threshold level required for detection processing.

At step 116, the three registration parameters, BAR, WAR and SCR, are loaded into the appropriate registers in the document edge detection operation. Then, when a document is scanned, the appropriate channel would be used for registration/detection processing using the set parameters stored loaded in the registers. A detailed description of dynamic registration based on the color of the skis is described in U.S. Ser. No. 2002/0126299-A1, entitled "Document Scanner Having Replaceable Backing and Automatic Selection of Registration Parameters".

One problem with an approach as described in U.S. Ser. No. 2002/0126299-A1, is that it may not provide accurate document registration when there is not sufficient luminance variation between the document and the color of the ski. For example, in some applications using a yellow ski/backing to mask defects in the scanned image may degrade performance of real-time document registration. Additionally, as discussed above, when supporting skis of various colors, there will be times when dynamic registration based on grayscale contribution may not be feasible such as with YCbCr scans or when the backing/ski has high luminance values.

Figure 4:
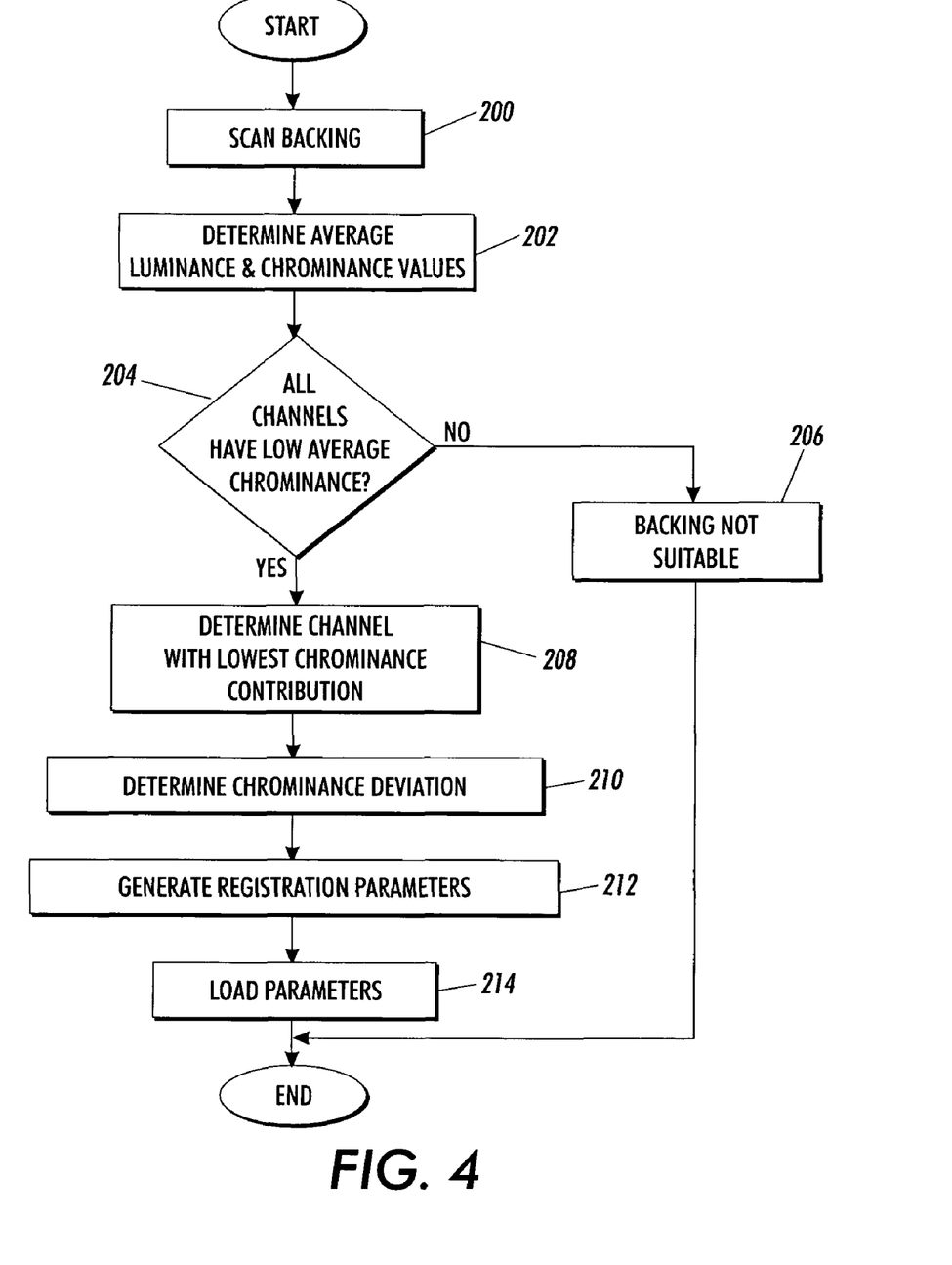
FIG. 4 shows an embodiment of a method for using registration parameters for detecting edges of documents supported by an associated ski in accordance with one aspect of the present disclosure.

Turning now to FIG. 4, there is shown a flowchart illustrating the steps in an embodiment of a process to accomplish the automatic loading of a suitable set of parameters for edge detection processing using chrominance information. The process begins at step 200 by scanning the CVT backing/ski with sensor 18 to obtain image data comprising a representative sample of the backing. For purposes of illustration, it will be assumed that the scan provides the Y Cb Cr values of each pixel in the scanline. That is, if the scanline contains N pixels, step 200 provides the values $Y_i$, $Cb_i$, $Cr_i$ for i=1 to N. Although described as operating with image data that comprises chromaticity information for the backing in the form of YCbCr, it should be appreciated that the teachings herein are applicable to other representations of color image data (e.g., Lab, Luv).

In step 202, the average Y Cb Cr values for the ski are determined using the pixels within the scanlines obtained in step 200. In one embodiment, the average values are calculated using all the values obtained in step 200. That is:

$$Cb_{avg} = \Sigma_1^N (Cb_i/N)$$

$$Cr_{avg} = \Sigma_1^N (Cr_i/N) \quad (6)$$

However, it should be appreciated that the average chrominance values (average chromaticity measurements) can also be computed using a sampling or subset of pixels across the scanline. Alternately, the median chrominance value in each of the channels may be obtained.

Using the computed average (or median) chrominance values, the process determines if one or both of the channels have a low level of chrominance (step 204). That is, if neither channel has a low average (median) level of chrominance (both have high average chrominance values) as determined by a threshold comparison, then an error message may be shown to the user indicating that the ski is not suitable for registering documents (step 206). That is, to properly register various types of input documents, the ski ought to have a low chrominance value in at least one of the channels for YCbCr scanning modes. If one or both of the channels have a low level of chrominance, the channel with the least level of chrominance contribution is generally used for document detection (step 208). However, as should be appreciated if both channels have low chrominance values (chromaticity measurements), as may be determined by comparing such chrominance values to a threshold chrominance (chromaticity), either channel may be used and the channel with the lower chrominance values need not be selected.

Once the channel to be used for registration is identified, the process determines the chrominance deviation (difference between maximum and minimum chrominance) of the ski in that channel (step 210). The average chrominance gives only an idea of the color of the ski. On the other hand, the chrominance deviation helps in determining the variability of the ski, which helps in calculating the three registration parameters necessary for document detection. Assuming the Cb channel is used for registration, step 210 generates the chrominance deviation $\Delta Cb$ as difference between the maximum and minimum Cb value obtained in the scan of step 200.

Having generated the chrominance deviation $\Delta_{Cb}$ for the detection channel at step 210, step 212 generates the three registration parameters BAR, WAR, and SCR. When performing a detection operation using chrominance value, the three registration parameters BAR, WAR, and SCR can be employed in the same manner as for a detection operation using gray levels. That is, for gray level data BAR identifies a threshold wherein input video having a gray level less than (i.e., darker or blacker than) the value in this register as treated as being outside the document, while for chrominance value BAR identifies a chrominance threshold wherein input video having a chrominance less than the value in this register as treated as being outside the document. Similarly, for gray level data WAR identifies a threshold wherein input video having a gray level greater (i.e., lighter or whiter) than the value in this register as treated as being inside the document while for chrominance data WAR identifies a threshold wherein input video having a chrominance value greater than the value in this register as treated as being inside the document. Similarly, with both gray level and chrominance data SCR identifies a threshold value wherein input video having a change over N pixels greater than the SCR value is treated as an edge.

For example, BAR can be set to $Cb_{avg}$, SCR can be set to the chrominance deviation $\Delta_{Cb}$ and WAR can be set to $Cb_{avg} + \Delta_{Cb}$. That is:

$$BAR_C = \begin{cases} Cb_{avg} & \text{if } Cb_{avg} \geq t_1 \\ t_1 & \text{if } Cb_{avg} < t_1 \end{cases} \quad (7)$$

$$SCR_C = \begin{cases} \Delta_{Cb} & \text{if } \Delta_{Cb} \geq t_2 \\ t_2 & \text{if } \Delta_{Cb} < t_2 \end{cases} \quad (8)$$

$$WAR_C = \begin{cases} Cb_{avg} + \Delta_{Cb} & \text{if } Cb_{avg} + \Delta_{Cb} \geq t_3 \\ t_3 & \text{if } Cb_{avg} + \Delta_{Cb} < t_3 \end{cases} \quad (9)$$

wherein $t_1$ is the minimum backing chrominance threshold level, $t_2$ is the minimum step change level and $t_3$ is the minimum document chrominance threshold level required for detection processing.

Having obtained the registration parameters, they can be loaded into the appropriate registers in the document edge detection operation for use when a document is scanned, the appropriate channel would be used for image registration and edged detection processing using the set parameters stored loaded in the registers.

Briefly summarizing, a small strip of the backing/ski surface is scanned to obtain chrominance values (e.g., YCbCr). From this scan, average Y, Cb and Cr values for the backing/ski being used in the scanner can be determined. Based on the average chrominance values, the channel(s) with low level of chrominance contribution is determined. If both channels have high level of chrominance values, then an error message may be shown to the user indicating that the backing/ski is not suitable for registering documents. The channel with the least level of chrominance contribution is typically used for document detection, although if both channels have low chrominance, the channel with the lowest chrominance need not be selected.

In one embodiment with a yellow ski, the Cb channel was used for registration as the Cb value for a Yellow ski was 40 and while a typical document having a white background had average lead edge luminance chrominance values Cb and Cr between 220-240 and 120-136, respectively. Once the channel for registration is determined, the chrominance deviation (difference between maximum and minimum chrominance) of the ski is determined in that channel. The average chrominance gives only an idea of the color of the ski. On the other hand, the chrominance deviation helps in determining the variability of the ski, which helps in calculating the three registration parameters necessary for edge detection in document scanning.

The above description of registration using chrominance channels assumes using similar hardware/software steps to determine the edge like that performed in the luminance channel. Alternatively, one could perform edge detection in chrominance channel by looking for deviation from the average chrominance level of the backing/ski and comparing the deviation against a threshold. In the example of a Yellow Ski, any neutral or "non-yellow" colored document would be detected as an edge so long as the chrominance value for the document deviates from the average chrominance level of the backing/ski by a chrominance deviation threshold $\delta$. That is, for the example given above, an edge is detected in the scanned image data when $|Cb-40|>\delta$, the where Cb is a chrominance value and $\delta$ is the chrominance deviation threshold.

Although the above teachings have used a single channel for registration (with a single set of registration parameters), it should be appreciated that more than one channel can be employed to detected edges and accurately register documents. For example, if a scan of the backing/ski surface yields chrominance values (e.g., YCbCr) with both the Cb and Cr channels having a low chrominance level, a set of registration parameters BAR, WAR, and SCR can be generated for each of the Cb and Cr channels. That is $BAR_{Cb}$, $WAR_{Cb}$, and $SCR_{Cb}$ can be generated from the Cb channel data collected and $BAR_{Cr}$, $WAR_{Cr}$, and $SCR_{Cr}$ can be generated from the Cr channel data collected.

Similarly, registration can use a set of registration parameters generated from gray level and a set of registration parameters generated from chrominance values. A scan on the backing/ski can be performed to collect both luminance and chrominance data. If the gray level data has a least one channel with a low average gray level and the chrominance data includes at least one channel with low level of chrominance contribution (a low average chrominance value), a set of registration parameters can be generated from each. That is, $BAR_G$, $WAR_G$, and $SCR_G$ can be generated from the gray level data and $BAR_C$, $WAR_C$, and $SCR_C$ can be generated from the chrominance data.

As should be appreciated, using multiple channels for image registration requires scanned image data for each of the multiple channels used for registration. The image data for each channel comprises multiple scanlines of image data with each scanline providing pixel data for selected locations along the scanline. Beneficially, the image data for each channel corresponds to the same scanlines and same selected locations along the a scanline; however, as should be appreciated by one skilled in the art, it is not required that each channel comprise image data for the same scanlines or pixels across a scanline.

Having received the image data for each registration channel, an independent edge detection process is performed for each of the multiple channels. That is, an independent edge detection process is performed for each of the multiple channels by looking for transitions, such as "black-to-white" or "white-to-black" transitions, in the image data for the registration channel with the BAR, WAR, and SCR registration parameters being used assist in the identification of the "black-to-white" and "white-to-black" transitions used for edge detection. As previously discussed, one common method of edge detection for electronic image registration can be performed by monitoring the image data to identify "black-to-white" or "white-to-black" transitions between pixels in the fastscan and/or slowscan directions to detect the edges of a document.

After each channel identifies a detected edge, a resolution operation is performed to determine which of the detected edges is the "actual" document edge. This actual document edge can the be used for subsequent document registration and skew processing. In one embodiment, the resolution operation performs a check to determine which one of the detected edges is closest to the "expected" edge location. The "expected" edge location (both fastscan and slowscan) can be determined during a registration setup procedure based on feeding "pure white" documents through the feeder and identifying the location of the detected edges. After feeding through a sufficient number of such sheets, the average or mean location of the edges identified can be determined and set out as the "expected" edge location. The resolution operation selects the detected edge which is closest to the "expected" edge location as being the actual document edge.

In another embodiment, if all the detected edges are within a given range of the "expected" edge location, then the resolution operation can compute the average or mean of all the detected edges as the actual edge. As should be appreciated, given range need not be symmetrical about the "expected" edge location and can be defined in a variety of ways including, for example, by a number of scanlines, a percentage of the document size, a multiple of a standard deviation, etc.

Furthermore, the resolution operation can use a hierarchical approach. With a hierarchical approach, a precedence model can be used to identify which detection channel will take precedence over other detection channels in given situations. The precedence model can take into account a variety of factors including, for example, channel type (e.g., gray level data or chrominance values), which channel detected the edge earliest, whether the detected edges are before or after the expected edge location, etc. to identify the actual edge location. Thus, if two or more of the detected edges is within a given range around the expected edge location, such as within a multiple of the standard deviations, then the resolution operation may set the actual document edge from those detected edges within the range based on the precedence model.

In summary, one aspect of the teachings herein provides a method of detecting registration parameters for a selected backing surface. The method includes obtaining image data comprising a representative sample of the backing surface, the image data including chrominance values in multiple channels for selected pixel locations along a scanline; determining an average chrominance values for each of the channels; selecting a registration channel based on the average chrominance value; determining a chrominance deviation for the registration channel; and determining registration parameters based on the average chrominance value and the chrominance deviation of the registration channel.

Thus, what has been described is a method for dynamic registration in the chrominance channel that provides the flexibility of scanning documents using black hole removal and in different color spaces without having to load new software onto the scanner or installing/uninstalling different colored skis. While particular embodiments have been described, alternatives, modifications, variations, improvements, and substantial equivalents that are or may be presently unforeseen may arise to applicants or others skilled in the art. Accordingly, the appended claims as filed and as they may be amended are intended to embrace all such alternatives, modifications variations, improvements, and substantial equivalents.

The invention claimed is:

1. In a document handler and imaging system, wherein different document sheets are sequentially moved past an imaging station by a document feeding system to be illuminated by a document illumination source and imaged by a document imager in the document imaging station, wherein the document imaging station includes a document backing surface having a selected color and a scanning sensor having at least two color sensitive channels and wherein at least one edge of a document sheet is detected in said document imaging station by said document imager, comprising:
a registration parameter detection circuit configured to:
receive image data comprising a representative sample of the backing surface, the image data including chrominance values in multiple channels for selected pixel locations along a scanline;
automatically determine an average, chrominance value for each of the multiple channels;
select a registration channel from the multiple channels based on the average chrominance values;
determine a chrominance deviation for the registration channel; and
determine a scanned image alignment registration parameter for aligning a scanned image to the backing surface based on the average chrominance value and the chrominance deviation of the registration channel.

2. The document handler and imaging system of claim 1, wherein the registration parameter detection circuit determines the chrominance level deviation for the registration channel as the difference between the maximum chrominance level value within the set of chrominance level values corresponding to the registration channel and the minimum chrominance level value within the set of chrominance level values corresponding to the registration channel.

3. The document handler and imaging system of claim 1, wherein the registration parameter detection circuit determines a registration parameter for a black average register (BAR) as a function of the average chrominance level of the registration channel, a step change register (SCR) as a function of the chrominance level deviation of the registration channel, and white average register (WAR) as a function of as both the average chrominance level and the chrominance level deviation of the registration channel.

4. The document handler and imaging system of claim 3, wherein the registration parameter detection circuit determines the registration parameter for the black average register (BAR) according to:

$$BAR_C = \begin{array}{l} Cb_{avg} \text{ if } Cb_{avg} \geq t_1 \\ t_2 \text{ if } Cb_{avg} \leq t_1 \end{array}$$

the registration parameter for the a step change register (SCR) according to $$SCR_C = \begin{array}{l} \Delta_{Cb} \text{ if } \Delta_{Cb} \geq t_2 \\ t_1 \text{ if } \Delta_{Cb} < t_1 \end{array}$$

and the registration parameter for white average register (WAR) according to $$WAR_C = \begin{array}{l} Cb_{avg} + \Delta_{Cb} \text{ if } Cb_{avg} + \Delta_{Cb} \geq t_3 \\ T_3 \text{ if } Cb_{avg} + \Delta_{Cb} < t_3 \end{array}$$

wherein $t_1$ is the minimum backing chrominance threshold level, $t_2$ is the minimum step change level and $t_3$ is the minimum document chrominance threshold level required for detection processing.

5. In a document handler and imaging system configured to sequentially move different document sheets past an imaging station by a document feeding system to be illuminated by a document illumination source and imaged by a document imager, a method of automatically detecting registration parameters for a selected backing surface, comprising:
obtaining image data via the document imager comprising a representative sample of the backing surface, the image data including chrominance values in multiple channels for selected pixel locations along a scanline;
determining an average chrominance value for each of the multiple channels;
selecting a registration channel from the multiple channels based on the average chrominance values;
determining a chrominance deviation for the registration channel; and
determining scanned image alignment registration parameters for aligning a scanned image to the backing surface based on the average chrominance value and the chrominance deviation of the registration channel.

6. The method of claim 5, further comprising providing a backing surface having a color being one of yellow, greenish yellow, green and black.

7. The method of claim 6, wherein the backing surface comprises a ski, the ski being adapted to be removably attached to a document handler.

8. The method of claim 5, wherein selecting said registration channel further comprises;
determining a chrominance deviation for the registration channel; and
determining registration parameters based on the average chrominance value and the chrominance deviation of the registration channel.

9. The method of claim 5, wherein determining said chrominance deviation further comprises determining the chrominance level deviation for the registration channel as the differences between the maximum chrominance level value within the set of chrominance level values corresponding to the registration channel and the minimum chrominance level value within the set of chrominance level values corresponding to the registration channel.

10. The method of claim 5, wherein determining said registration parameters further comprises: determining a registration parameter value for a black average register (BAR) as a function of the average chrominance level of the registration channel; determining a registration parameter value for a step change register (SCR) as a function of the chrominance level deviation of the registration channel; and determining a registration parameter value for a white average register (WAR) as a function of as both the average chrominance level and the chrominance level deviation of the registration channel.

11. The method of claim 5, wherein the determining and selecting steps are performed using a processor.

* * * * *